Oct. 28, 1924.　　　　　　　　　　　　　　　　　　1,513,144
S. K. WELLMAN
TRACTION MECHANISM FOR TRACTORS
Filed March 18, 1921　　　2 Sheets-Sheet 1
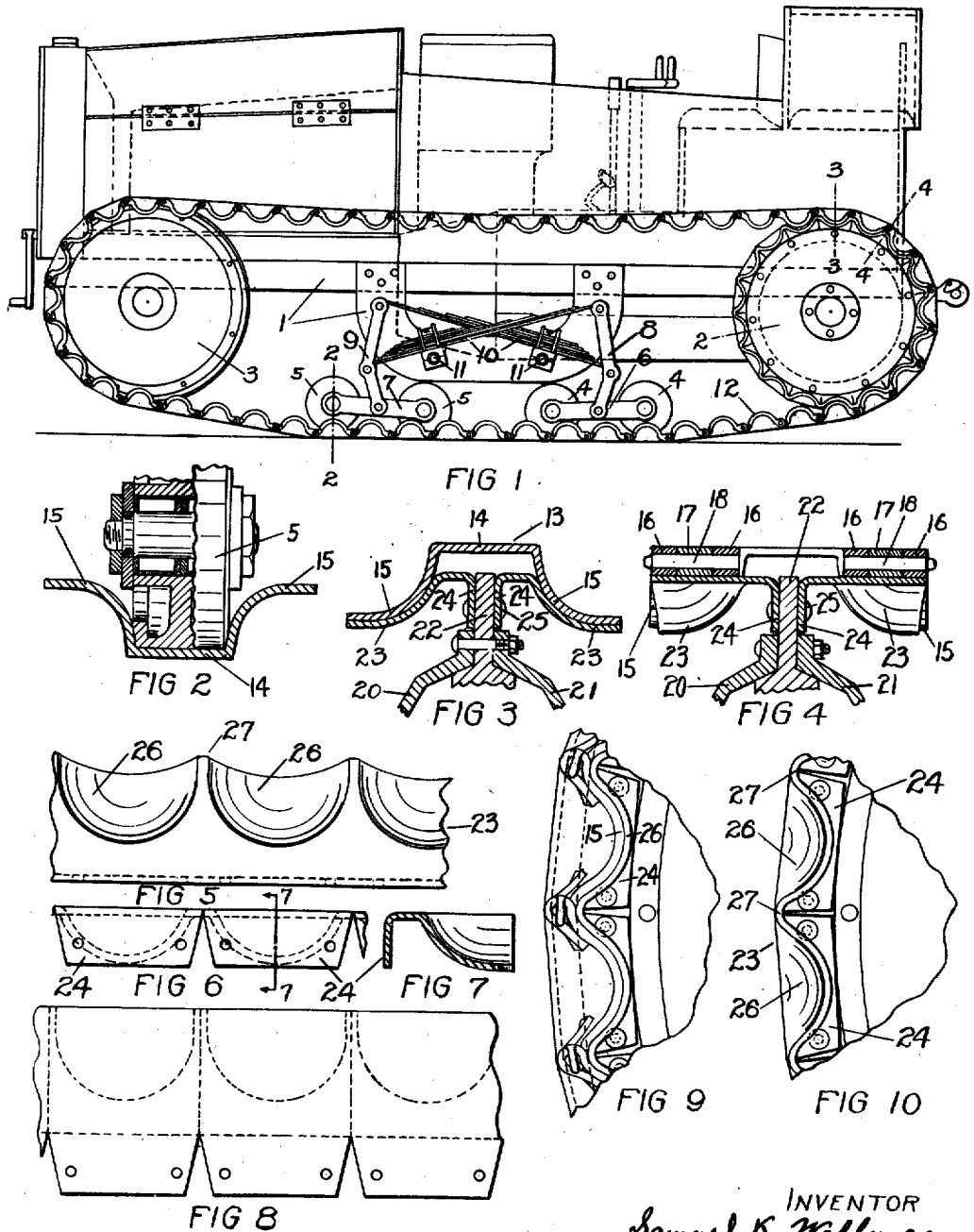

Oct. 28, 1924. 1,513,144
S. K. WELLMAN
TRACTION MECHANISM FOR TRACTORS
Filed March 18, 1921 2 Sheets-Sheet 2

INVENTOR
Samuel K. Wellman
By Ray Slocker
Attorney

Patented Oct. 28, 1924.

1,513,144

UNITED STATES PATENT OFFICE.

SAMUEL K. WELLMAN, OF CLEVELAND, OHIO.

TRACTION MECHANISM FOR TRACTORS.

Application filed March 16, 1921. Serial No. 453,278.

*To all whom it may concern:*

Be it known that I, SAMUEL K. WELLMAN, a citizen of the United States, and resident of Cleveland, in the county of Cuyahoga and State of Ohio, have invented certain new and useful Improvements in a Traction Mechanism for Tractors, of which the following is a specification, reference being had therein to the accompanying drawings.

The invention relates to the traction mechanism of tractors of the crawler or endless belt type, and is concerned especially with the form and construction of the endless belt and the cooperating driving and supporting wheels interposed between the belt and the main frame of the machine. As is well understood, the endless traction belts of a machine of this class must be adapted to suitably cooperate with driving sprocket wheels and also must function as supporting and guiding tracks for the weight-bearing wheels of the machine.

One of the objects of the invention is to provide an improved endless belt and sprocket mechanism characterized by a minimum of wear at the mutually engaging surfaces of the belt and sprockets.

Another object of the invention is to provide an improved traction belt which is adapted to present to a hard smooth road, supporting surfaces of adequate area to obviate penetration and injury of such road and which, at the same time, is also adapted to present to a soft road gripping surfaces that give the belt an exceedingly effective grouser action.

A further object of the invention is to provide a traction belt of the character last referred to having links that are simple in construction and adapted to be easily produced, as by stamping or pressing or rolling from sheet metal or by forging.

Another object of the invention is to provide a traction belt of the character referred to which has both adequate strength and light weight.

Another object of the invention is to produce a traction belt of the character referred to which can be produced at low cost.

A further object of the invention is to provide a simple, strong and light sprocket wheel adapted to cooperate with my improved traction belt.

The nature of the foregoing objects and the manner in which they are attained will be clearly understood from the following description in connection with the accompanying drawings which illustrate preferred forms of construction embodying the invention.

In the drawings, Figure 1 is a side elevation of a tractor fitted with my improved mechanism.

Fig. 2 is an enlarged fragmentary section on the line 2—2, Fig. 1.

Fig. 3 is an enlarged fragmentary section on the line 3—3, Fig. 1.

Fig. 4 is an enlarged fragmentary section on the line 4—4, Fig. 1.

Fig. 5 is an enlarged fragmentary plan view of a development of one of the sprocket rims of the sprocket wheel.

Fig. 6 is an enlarged fragmentary side view of the same.

Fig. 7 is a section on the line 7—7, Fig. 6.

Fig. 8 is an enlarged fragmentary view of one of the sprocket rims blanked out from plate metal and ready to be bent and pressed into shape.

Fig. 9 is an enlarged fragmentary side view of the driving sprocket wheel and belt.

Fig. 10 is a similar view of a part of the sprocket wheel.

Figure 11:
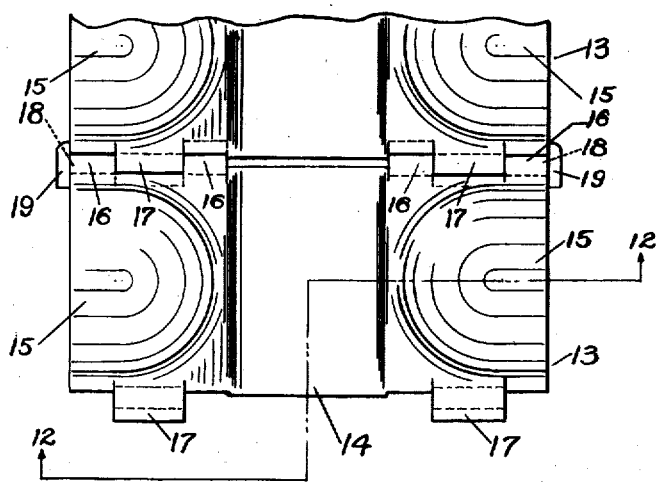
Fig. 11 is an enlarged plan view of two of the links of the endless belt.

Referring in detail to the construction illustrated, 1 designates the main frame structure of an endless belt tractor, 2 is one of the two driving sprocket wheels suitably mounted on said main frame, 3 is one of the two idlers also mounted on the main frame, 4, 4 and 5, 5 are weight supporting wheels rotatably mounted on trucks 6 and 7, respectively, which are connected to the main frame by means of bars 8 and 9 and springs 10, 10, said springs being pivotally mounted at 11 on the main frame structure. 12 designates in its entirety an endless belt track which passes around the sprocket wheel 2, and the idler 3 and upon which the weight supporting wheels 4 and 5 run.

The main frame carries the engine, transmission mechanism, control devices, driver's seat and various other parts of a tractor of this character, but the present invention is not concerned with these parts and, as they may be of any suitable construction, they need not be described.

Figure 12:
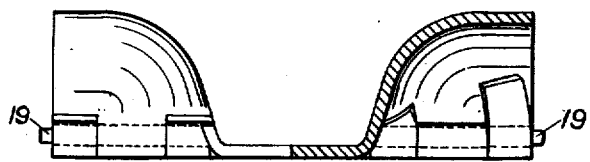
Fig. 12 is a sectional elevation of one of said links, the section being taken on the line 12—12, Fig. 11.
Figure 13:
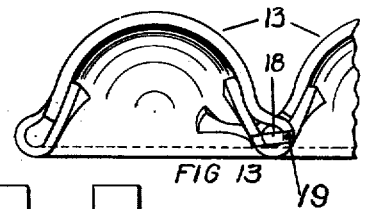
Fig. 13 is a side elevation of the links shown in Fig. 11.

The ground-engaging belt 12 is of a peculiar and novel form, being made up of a series of articulated links 13. Considering one of these links as it rests upon the ground, it has a flat longitudinally extending central part 14, and side parts formed with elevations 15 which rise above the central part 14 and are recessed on their under sides, as shown in Figs. 12 and 13. These elevations 15 are preferably given a rounded or spherical form. The side parts of each link are provided at one end with pairs of apertured lugs 16, 16 and at the other end with apertured lugs 17 which are adapted to be brought into alignment with the lugs 16 of an adjacent link to receive pivot pins 18, 18. These pivot pins 18 are secured against endwise displacement by clips 19 which are preferably formed integral with the link and bent over the ends of the pivot pins 18 after the latter are inserted.

Figure 14:
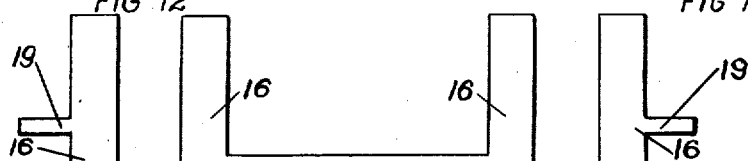
Fig. 14 is a plan view of one of the links blanked out from plate metal and ready to be bent and pressed into the form shown in Figs. 11, 12 and 13.

From the foregoing, it will readily be seen that the links can be formed from plate metal and in Fig. 14 I have shown a link after it has been blanked out from a metal plate and before it has been bent and pressed into its final form. It will be observed that the tongue which is to form the outside one of each pair of pivot lugs 16 is formed with a lateral extension which constitutes the clip 19 above referred to. The blank shown in Fig. 14 is placed in a press which strikes up the elevations 15 and thereafter the extending tongues are bent to form pivot lugs 16 and 17. The bent over ends of these lugs 16 and 17 can be secured to the body of the link in any suitable manner, as by spot welding or riveting.

Instead of first forming the blanks, as shown in Fig. 14, from plate metal and then shaping them in a press, a more or less elongated strip of plate metal can be passed through rolls to form the elevations 15 for a series of links, the latter being then separated from each other by a stamping or punching operation.

Figure 15:
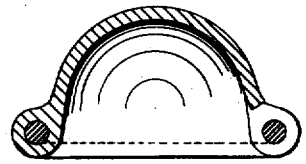
Fig. 15 is a section through a link of modified construction.

Again, instead of forming the links from plate metal as above described, they may be formed by forging suitable blanks to the form shown in Fig. 15. In this latter case, it is necessary to drill out the pin apertures of the pivot lugs. The forging method has the advantage that different parts of the link can be made of different thicknesses, as desired, to insure both adequate strength and minimum weight.

While I have, in each of the constructions shown, provided pins for pivotally connecting the links together, the links can be connected in other ways.

On reference to Figs. 1 and 2, it will be seen that the weight-supporting wheels 4 and 5 are of a size and form to run between the elevations 15 of the links and upon the flat central parts 14 thereof, the flat parts of the link affording a smooth track while the elevated sides of the link serve as guides to hold the wheels on the track.

The driving sprocket wheel 2 can be constructed in various ways to cooperate with the links of the belt 12, but I prefer to construct the sprocket wheel as shown in the drawings. As shown, said wheel comprises a pair of discs 20, 21 which are provided with suitable hub parts and their outer peripheries are bolted to an intermediate member having a radially extending flange 22. To this flange 22 are riveted a pair of sprocket rims 23, 23. Each of these rims is formed with a series of inwardly turned flanges 24, 24 which abut against the flange 22 and are perforated to receive rivets 25 which secure the rims to said flange. Each rim is formd with a series of alternating depressions 26, 26 and elevations 27, 27, said depressions being adapted to receive the elevations 15 of the belt links so that the elevations 27 of the wheel serve as sprockets. It is to be observed, however, that the coaction of the sprocket elevations 27 and the link elevations 15 differs radically from that which characterizes the ordinary sprocket and chain. That is to say, in the present construction. the elevations 15 of the links are intermediate the pivotal joints of the links, in fact approximately in the longitudinal centers of the links, whereas in the commonly employed prior sprocket and chain constructions, the chain parts engaged by the sprockets are disposed at and usually concentric with the pivotal joints. The result is that the rubbing and wear between the coacting sprocket and chain surfaces which characterize the usual prior constructions, are largely obviated in my construction.

The rim or sprocket part of the drive wheel 2 can be made in any suitable way, but I prefer the construction illustrated in which the sprocket rims 23 are formed from sheet or plate metal. In Fig. 8, I have shown a part of one of the rims blanked out from plate metal and ready to be bent and pressed into finished form. The wheel 3, being an idler, is shaped at its periphery like the wheels 4 and 5, as shown in Fig. 2.

On referring to the various figures of the drawings, it will be seen that a traction belt made with my improved form of link is well adapted to cooperate with the drive sprocket and with the weight-supporting wheels of the machine. As above pointed out, the flat central parts of the links constitute a smooth, substantially continuous track for the supporting wheels and said wheels are effectively guided to follow this track by the elevated side sections 15 of the links. The securing of a continuous, smooth track for the supporting wheels is facilitated by arranging the pivot connections of the link between the side parts thereof so that the flat central parts 14 of the links can be brought relatively close together. The connecting joints are preferably arranged with their pivotal axes approximately in the planes of the flat central parts of the links.

In addition, my improved traction belt is admirably adapted to travel over all sorts of surfaces. On a hard, smooth road, the flat central parts of the links constitute a smooth tread of ample area so that the surface of the road is not injured. On the other hand, when the tractor is traveling over soft ground, the belt links sink into the ground and the elevated side parts of the links, recessed on their under sides, grip the ground with an effective grouser action.

While the links of my improved belt are very light in weight, they are, because of their form, extremely rigid and strong. Also, with suitable equipment, the links can be made in quantity at a very moderate cost.

It will be understood that various modifications of the form and arrangements of the parts of my improved traction mechanism can be made without sacrificing the advantages of the invention, the scope of which is indicated by the appended claims.

What I claim is:

1. In a traction mechanism for tractors, the combination with an endless ground-engaging belt having articulated links of which each has a flat longitudinally extending central part and elevated side parts which are recessed on their under sides to afford a grouser action, of a driving sprocket wheel having engagement with the belt links only through the wheel sprockets and said elevated side parts of the belt links.

2. In a traction mechanism for tractors, the combination with an endless ground-engaging belt having articulated links of which each has a flat longitudinally extending central part and elevated side parts which are recessed on their under sides to afford a grouser action, of a driving wheel having sprockets formed to operatively engage said elevated side parts of the belt links and having no other engagement with said links, and weight-sustaining wheels adapted to roll upon the central parts of the links between the elevated side parts thereof and be guided by said side parts.

3. In a traction mechanism for tractors, the combination with a driving sprocket wheel and weight-supporting wheels, of an endless ground-engaging belt comprising a series of links formed to engage the driving wheel sprockets, each link having a flat longitudinally extending central part and elevated side parts which are recessed on their under sides to afford a grouser action, and means pivotally connecting the links on axes approximately in the planes of the flat central parts of the links, whereby a continuous surface is afforded on which the weight-supporting wheels roll.

4. In a traction mechanism for tractors, the combination with an endless ground-engaging belt comprising a series of links of which each has a flat longitudinally extending central part and elevated side parts which are recessed on their under sides to afford a grouser action and means pivotally connecting the side parts of adjacent links on axes approximately in the planes of the flat central parts of the links, of a driving wheel having sprockets formed to operatively engage said elevated side parts of the belt links, and weight sustaining wheels adapted to roll upon the central parts of the links between the elevated side parts thereof and be guided by said side parts.

5. In a traction mechanism for tractors, the combination with an endless ground-engaging belt comprising a series of metal links and metallic means for pivotally connecting together adjacent links on axes approximately in the planes of the radially outermost ground-engaging portions of the links, said links being formed with elevated parts disposed substantially midway between their pivotal connections, of a driving wheel having sprockets formed to operatively engage said elevated parts of the belt links to effect either forward or backward traction substantially without lost motion between the driving wheel and the belt.

6. In a traction mechanism for tractors, the combination with an endless ground-engaging belt comprising a series of metal links each having a flat longitudinally extending central part and elevated side parts which are recessed on their under sides to afford a grouser action and metallic means for pivotally connecting together adjacent links on axes approximately in the planes of said flat central parts of the links, of a driving wheel having sprockets formed to operatively engage said elevated parts of the belt links to effect either forward and backward traction substantially without lost motion between the driving wheel and the belt.

7. A sprocket wheel for tractors and the like comprising in combination a body and a pair of circumferentially extending plate metal sprocket rims, each of said rims having a series of inwardly bent flanges rigidly secured to the peripheral part of the body and being formed with depressions adapted to operatively engage elevations on a traction belt.

8. In a traction mechanism for tractors, the combination with an endless ground-engaging belt comprising a series of links pivotally connected together, said links each having a flat longitudinally extending central part and elevated concavo-convex side parts with their concave sides underneath to afford a grouser action, of a driving sprocket wheel having sprockets formed to operatively engage the upper convex surfaces of said side parts of the links.

9. A traction belt for tractors comprising a series of articulated links each formed of plate metal and having a flat central part extending longitudinally from the front edge to the rear edge of the link and elevated side parts with recesses on their under sides to afford a grouser action, and means pivotally connecting the links on axes approximately in the planes of the flat central parts of the links.

10. A traction belt for tractors comprising a series of links each of substantially uniform thickness and having a flat longitudinally extending central part and elevated side parts with recesses on their under sides to afford a grouser action, and means pivotally connecting the links on axes approximately in the planes of the flat central parts of the links.

11. A traction belt for tractors comprising a series of links each formed of plate metal and having a flat longitudinally extending central part and elevated side parts with recesses on their under sides to afford a grouser action, and means pivotally connecting the links on axes approximately in the planes of the flat central parts of the links.

12. As an article of manufacture, a traction belt link for tractors having a flat longitudinally extending central part, elevated side parts which are recessed on their under sides to afford a grouser action, and means at its front and rear edges adapted to cooperate with the rear and front edges, respectively, of similar links to form pivotal joints with axes approximately in the planes of the said central part.

14. As an article of manufacture, a traction belt link for tractors formed of plate metal and having a flat longitudinally extending central part, elevated side parts with recesses on their under sides to afford a grouser action, and means at the front and rear edges of said side parts adapted to cooperate with the rear and front edges, respectively, of similar links to form pivotal joints with axes approximately in the plane of the said central part.

In testimony whereof, I hereunto affix my signature.

SAMUEL K. WELLMAN.

Certificate of Correction.

It is hereby certified that in Letters Patent No. 1,513,144, granted October 28, 1924, upon the application of Samuel K. Wellman, of Cleveland, Ohio, for an improvement in "Traction Mechanism for Tractors," an error appears in the printed specification requiring correction as follows: Page 4, line 52, last claim, for the numeral "14" read *13;* and that the said Letters Patent should be read with this correction therein that the same may conform to the record of the case in the Patent Office.

Signed and sealed this 3d day of March, A. D. 1925.

[SEAL.]

KARL FENNING,
*Acting Commissioner of Patents.*